Figure 1:
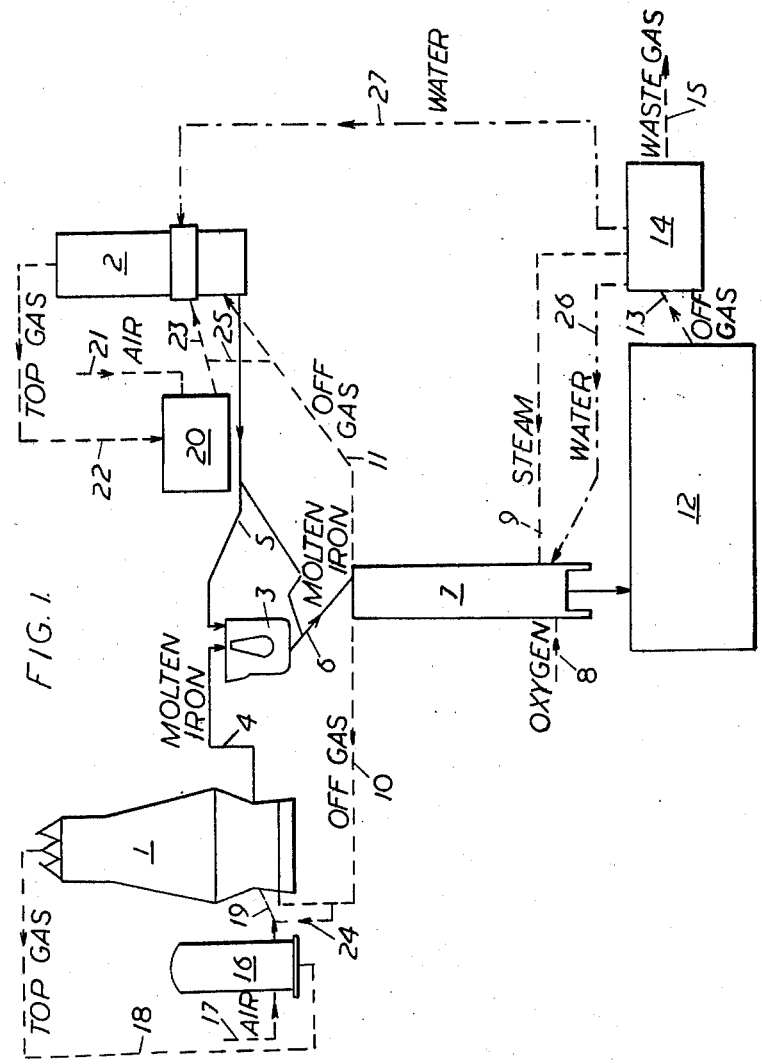

Nov. 1, 1960

T. C. CHURCHER 2,958,597

MANUFACTURE OF STEEL

Filed March 2, 1959

2 Sheets-Sheet 1

Inventor
THOMAS CHRISTOPHER CHURCHER

By

Attorney

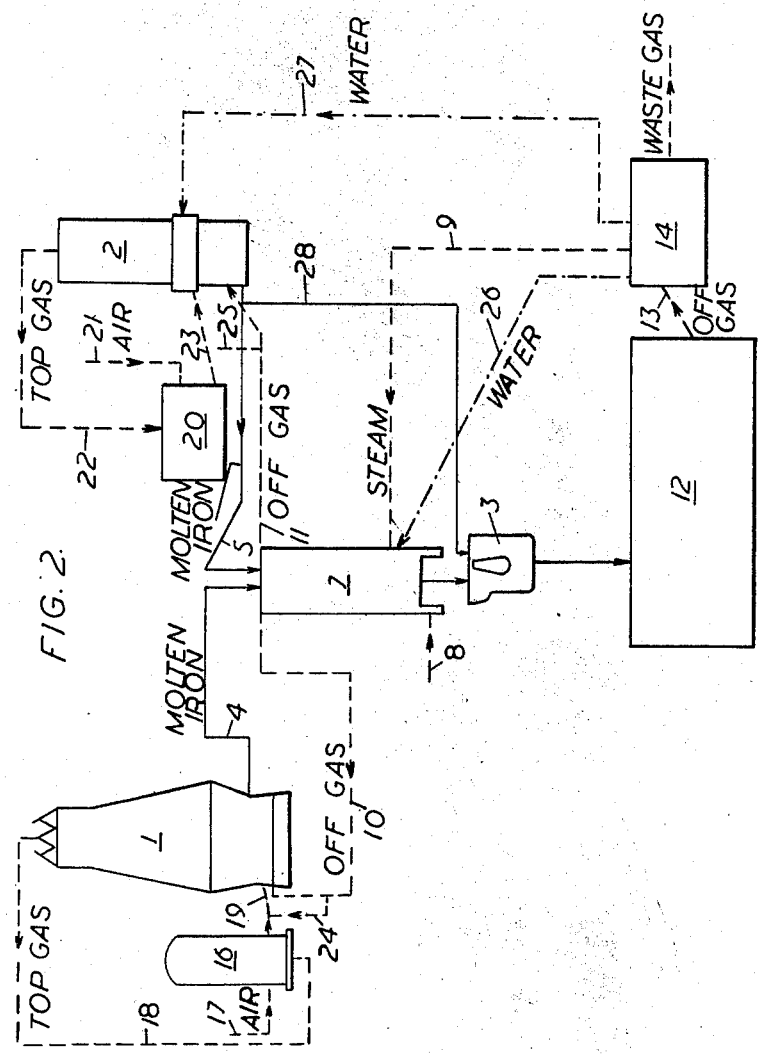

2,958,597
MANUFACTURE OF STEEL

Thomas Christopher Churcher, Sutton, England, assignor to The British Oxygen Company Limited, a British company Filed Mar. 2, 1959, Ser. No. 796,425

Claims priority, application Great Britain Mar. 6, 1958

9 Claims. (Cl. 75—46)

The present invention relates to a process for the manufacture of steel in which molten iron from a blast furnace or a cupola is treated to effect a partial refining, and the treated metal is subsequently converted to steel in a steelmaking furnace, such as an open hearth furnace, an electric furnace, or a converter.

It is an object of the invention to provide a steelmaking process of this type in which efficient use is made of the heat generated in the various process steps, thus enabling the process to be operated with increased heat economy.

According to the present invention, a process for the manufacture of steel comprises treating molten iron from a blast furnace and/or a cupola by allowing it to fall in the form of a plurality of fine streams or droplets through a reaction zone in contact with an oxidising gas or gases in admixture with steam, converting the treated metal to steel in a steelmaking furnace, feeding fume-laden gas leaving the reaction zone to the lower part of the blast furnace or cupola, and using hot waste gases from the steelmaking furnace to raise steam for admixture with the oxidising gas or gases. The fume laden gas assists in maintaining the temperature of the blast furnace or cupola, and moreover, the iron oxide present therein as fume is recovered.

In United States Patent No. 2,811,435 assigned to The British Oxygen Company Limited there is described and claimed a method for the removal and disposal of fumes arising from the action of oxygen on molten iron or steel in which the fumes are confined within a limited space above the surface of the metal and thence delivered to the lower part of a blast furnace. The present invention not only possesses the advantages of this process but enables a greater heat economy to be achieved.

The treatment step may be carried out as described in United States Patent No. 2,819,160 assigned to The British Oxygen Company Limited, the reaction zone being constituted by the interior of a refractory-lined tower packed with incombustible packing material through which the molten metal is passed downwardly in counter-current to a stream of an oxidising gas or mixture of gases in such manner that an oxidising zone is produced at the top of the tower and a reducing zone at the bottom. The packing which may be of a material which will assist in the removal of impurities from the molten iron, such as, for example, limestone or lime, is preheated to a temperature such that the molten metal does not freeze during its passage through the tower. The packing may include one or more fluxing agents and fluxing material may alternatively or in addition be introduced in suspension in powder form in the oxidising gas stream. The packing may also include slag.

Alternatively, the treatment step may be carried out as described in co-pending application Nos. 699,121 and 762,972 both assigned to The British Oxygen Company Limited. In these applications, the molten metal is allowed to fall freely through the reaction zone, which may be constituted by the interior of a hollow tower, in contact with a stream of oxidising gas, which may flow in the opposite direction to the fall of the metal, as described in application No. 699,121, now abandoned, or in the same direction, as described in application No. 762,962. The molten metal is preferably allowed to fall through the reaction zone in the form of a plurality of fine streams or of droplets, which may be produced by any of the methods described in application Nos. 699,121 and 762,962. For example, the molten metal may be fed at the top of the reaction zone into a cup or crucible of refractory material having in its bottom one or more holes through which the metal can pass to form a fine stream. The hole or holes may be between $\frac{1}{16}$ inch and $\frac{1}{2}$ inch in diameter. Alternatively, the molten metal may be arranged to flow over a weir system so shaped as to cause the molten metal to flow as one or more relatively thin streams which may break up into droplets as the molten metal falls through the reaction zone under the influence of gravity. Other alternative arrangements include arranging for the molten metal to fall on to one or more baffles of refractory material; mechanically deflecting and splitting the stream of metal entering the reaction zone, for example by a jet of oxygen or other oxidising or inert gas; and permitting two or more metal streams to impinge against one another at the top of the reaction zone so that the streams are deflected and broken up.

The oxidising gas may contain one or more powdered oxidising agents, or one or more powdered slag-forming and/or fluxing materials in suspension therein.

The treated metal may be collected on a hearth located at the bottom of the reaction zone and tapped thence as required continuously or intermittently to the steelmaking furnace. Alternatively, the treated metal may be received directly into a ladle or other movable receptacle stationed beneath the reaction zone, and transported therein to the steelmaking furnace. As yet another alternative, the reaction zone may be located above the steelmaking furnace, so that the molten metal falls directly through the reaction zone into the steelmaking furnace.

The oxidising gas used in the treating step of the present invention consists of oxygen or oxygen-containing gases or vapours. For example, the gas may consist of air, oxygen-enrichment air, oxygen, carbon dioxide, or oxygen diluted with an inert gas. These gases may be used singly or in any appropriate combination. They may, if desired, be preheated. The oxidising gas or mixture of gases is admixed with steam, which aids in the suppression of fume formation in the treatment step.

The oxidising gas and the steam may be fed together to the reaction zone through one or more tuyeres located at the top or bottom of the reaction zone according as co-current or counter-current flow of the metal and oxidising gas streams is required, and if desired, through additional tuyeres or sets of tuyeres located at various levels up the reaction zone. Alternatively, the oxidising gas may be fed to the reaction zone through one set or sets of tuyeres and the steam fed through a separate set or sets. Where the reaction zone is constituted by the interior of an empty refractory lined tower, wear on the refractory lining may be minimised by using at each level, one or more pairs of tuyeres each pair being located diametrically opposite one another, so that the jets of gas impinge against each other at the axis of the tower and the reacting materials are not directed against the refractory lining.

The steelmaking furnace may be an open-hearth furnace, converter, or electric furnace.

The molten iron may be fed directly to the reaction zone from the blast furnace or cupola, either intermittently or continuously. Alternatively, the molten iron may be fed to a transfer vessel, such as a ladle, and thence poured through the reaction zone.

Where intermittent feeding of the molten iron to the reaction zone is used, it may be convenient to preheat the zone during the idling periods in preparation for the next batch of metal. Such preheating may be effected by burning a liquid or gaseous fuel with oxygen within the reaction zone. The hot gaseous combustion products, which will not, of course, be fume-laden can be fed directly to the hot blast line to the blast furnace or cupola.

Normally, in the treatment step, the content of unwanted metalloids, such as silicon, sulphur and phosphorus, in the molten iron will be reduced whilst removing as little as possible of the carbon. Where a cupola is used, however, for melting scrap, it may be desirable that some decarburisation is effected before the metal enters the steelmaking furnace, and this may be effected during the treatment of the metal in the reaction zone.

Again, if the treatment of the molten iron in the reaction zone is arranged to remove phosphorus, some loss of carbon is likely to occur. This loss may be compensated by feeding metal from the cupola, which is over rich in carbon, directly to the steelmaking furnace.

The hot waste gases from the steelmaking furnace are used to raise steam for admixture with the oxidising gas fed to the treatment step. Water from the waste heat boiler used for this purpose may be circulated by the thermosyphon system of the boiler to cool appropriate parts of the installation, for example the roof and doors of an open-hearth furnace or the tuyeres of a cupola furnace or of the pretreatment tower, in place of water from a cold water source, thus effecting an additional heat economy. Any surplus amount of steam produced in the waste heat boiler above that required for admixture with the oxidising gas can be put to any useful purpose desired.

The blast furnace or cupola acting as a source of the molten iron will normally be provided with means by which the heat content of hot waste gases is recovered and used to preheat the blast supply to the blast furnace or cupola, such as, for example, a Cowper preheater or a recuperator.

The invention is illustrated by the accompanying drawing in which:

Figure 1 shows diagrammatically one arrangement for carrying out a process in accordance with the present invention; and Figure 2 shows an alternative arrangement; corresponding elements in Figures 1 and 2 are indicated by the same reference numerals.

Molten iron from a blast furnace 1 and/or cupola 2 is fed to a mixing vessel 3 through runners 4 and 5 respectively. The molten iron from the mixing vessel 3 is fed through a runner 6 to the top of a refractory-lined tower 7 down which it is constrained to pass in the form of a plurality of separate streams or droplets, as, for example, by passage through a crucible located at the top of the tower and having perforations in the bottom thereof. The tower 7 may be either packed with non-combustible packing material such as limestone or lime or it may be empty. Oxygen is fed to one or more tuyeres at the bottom of the tower 7 through a pipe 8 and simultaneously steam is also fed to tuyeres at the bottom of the tower through a pipe 9, so that a mixture of oxygen and steam rises upwardly through the tower in countercurrent to the descending stream of molten iron and acts to refine the molten metal by oxidation of impurities therein. The waste gas containing iron oxide fume is withdrawn from the top of the tower and fed through a conduit 10 to the lower part of the blast furnace 1 or through a conduit 11 to the lower part of the cupola 2 or to both, depending on the particular source of sources of molten iron in use at the time.

As an alternative to admitting the oxygen and steam near the bottom of the tower as above described they can be admitted near the top of the tower so that over much of the height of the tower they flow in cocurrent with the metal to be treated. The oxygen and steam may be admitted through one or more pairs of tuyeres, the tuyeres of each pair being located diametrically opposite one another so that the jets of gas from each pair impinge against each other at the axis of the shaft, and not only prevent the stream of molten metal being driven against the refractory wall of the shaft, as would happen if one tuyere were used at each level, but also create a zone of turbulence at the axis of the shaft through which the molten material has to pass. This turbulence assists both in breaking up the streams of molten material and in oxidising the impurities therein.

The tower 7 is located immediately above a steelmaking furnace 12 so that the molten iron may fall through the bottom of the tower 7 which is open directly into the furnace 12 where it is converted to steel. The furnace 12 may be an open-hearth furnace, an electric furnace, or a converter as desired. The off-gas from the furnace 12 is passed through a conduit 13 to a waste heat boiler 14 where its heat is used to raise steam. Off-gas from the waste heat boiler 14 is withdrawn to waste through a conduit 15. The steam raised in the waste heat boiler is fed to the bottom of the tower 7 through the conduit 9 as previously described.

The blast furnace 1 is provided with a Cowper preheater 16 to preheat air fed to the preheater through a conduit 17 by heat exchange with top gas from the blast furnace fed to the preheater 16 through a conduit 18. The hot air blast is fed from the preheater 16 to the blast furnace 1 through a line 19. Similarly, the cupola 2 is provided with a recuperator 20 in which air entering through a conduit 21 is heated by the top gas from the cupola fed to the recuperator through a conduit 22. The hot air blast is fed from the recuperator 20 to the cupola 2 through a line 23.

During idling periods when the mixing vessel 3 is being filled with molten iron and the tower 7 is consequently not in use, the high temperature within the tower is maintained by burning fuel with oxygen therein. During these periods, the off gas from the tower does not contain iron oxide fume and is fed directly to one or both of the hot air blast lines 19 and 23 to the blast furnace 1 and the cupola 2 through branch conduits 24 and 25 respectively.

Water from the waste heat boiler 15 is circulated by the thermosyphon system of the boiler through a conduit 26 to cool the tuyeres of the tower 7 and through a conduit 27 to cool the tuyeres of the cupola.

As shown in Figure 2, as an alternative to interposing the tower 7 between the mixer 3 and the steelmaking furnace 12, the tower may be disposed so that metal from the blast furnace 1 or cupola 2 passes through the tower before passing to a mixer such as 3 or the furnace 12. Metal from the cupola 2 may be fed to the mixer 3 without passing through the tower 7 through a runner 28.

The runners 4, 5 and 6 or any of them can be replaced by a stage in which the molten metal is conveyed by a ladle or other convenient means such as an active or inactive travelling mixer.

I claim:

1. Process for the manufacture of steel comprising the steps of treating molten iron from a shaft furnace by allowing it to fall freely in sub-divided form through the interior of an unpacked refractory-lined tower in co-current contact with a stream of an oxidising gas in admixture with steam flowing downwardly through said tower, feeding treated molten iron from the bottom of said tower to a steelmaking furnace and therein converting it to steel, feeding fume-laden gas leaving said tower to the lower part of said shaft furnace, and using hot waste gases from said steelmaking furnace to raise steam for admixture with said oxidising gas.

2. Process according to claim 1 wherein said oxidising gas contains powdered fluxing material in suspension therein.

3. Process according to claim 1 wherein the treated molten iron is collected at the bottom of said tower and is fed thence to said steelmaking furnace as required.

4. Process according to claim 1 wherein said tower is located above said steelmaking furnace in such manner that the molten iron falls directly through said tower into said steelmaking furnace.

5. Process according to claim 1 wherein said oxidising gas and said steam are fed together to said tower.

6. Process according to claim 1 wherein said molten iron is fed intermittently from said shaft furnace to said tower.

7. Process according to claim 1 wherein both a blast furnace and a cupola are used for the production of molten iron, molten iron rich in carbon being fed directly from said cupola to said steelmaking furnace to compensate for loss of carbon during treatment of molten iron from said blast furnace in said tower.

8. Process according to claim 6 wherein said tower is preheated during periods when molten metal is not passing therethrough.

9. Process according to claim 8 wherein said preheating is effected by burning a fluid fuel with oxygen in said tower, the hot combustion products being fed directly to the hot blast line to said shaft furnace.

References Cited in the file of this patent
UNITED STATES PATENTS

| | | |
|---|---|---|
| 558,947 | Hawkins | Apr. 28, 1896 |
| 1,751,185 | Wust | Mar. 18, 1930 |
| 2,819,160 | Bannister et al. | Jan. 7, 1958 |